United States Patent [19]

Friedline et al.

[11] 4,140,431
[45] Feb. 20, 1979

[54] CUTTING INSERT

[75] Inventors: Ernest J. Friedline; Donald W. Warren, both of Latrobe, Pa.

[73] Assignee: Kennametal Inc., Latrobe, Pa.

[21] Appl. No.: 852,711

[22] Filed: Nov. 18, 1977

[51] Int. Cl.² .......................... B26D 1/00; B26D 3/00
[52] U.S. Cl. ...................................... 407/114; 407/61
[58] Field of Search .................. 407/114, 115, 116, 61

[56] References Cited

U.S. PATENT DOCUMENTS

| 3,460,409 | 8/1969 | Stokey | 407/115 |
| 3,574,911 | 4/1971 | Penoyar | 407/61 |
| 4,068,976 | 1/1978 | Friedline | 407/114 |

*Primary Examiner*—Leonidas Vlachos
*Attorney, Agent, or Firm*—Lawrence R. Burns

[57] ABSTRACT

A cutting insert, especially for milling cutters and the like, and which is to be mounted in a tool holder in a negative radial rake position. The insert is indexable and invertable and has a cutting edge means. The peripheral wall adjacent the cutting edge means has recesses therein which interrupt the cutting edge means. The depth of the recesses becomes shallower as the recesses extend away from the cutting edge means until the recess terminates in the peripheral wall. An insert having at least two cutting edges is described wherein the insert has at least two cutting edges and the recesses interrupting one cutting edge are staggered relative to the recesses interrupting the other cutting edge when the cutting edges are viewed in superposed relation.

11 Claims, 10 Drawing Figures

CUTTING INSERT

BACKGROUND OF THE INVENTION

The present invention relates to cutting inserts, and is especially concerned with cutting inserts used in milling operations, and particularly inserts found to be very effective for very heavy duty milling.

In heavy duty milling operations, it is known that inserts having interrupted cutting edges can be used in cooperation with one another to machine a planar surface in a manner that reduces the possibility of chatter and further achieves a reduction in power consumption and heat generated. Such inserts are described in U.S. Pat. Nos. 3,636,602 and 3,574,911 and applicant's own patent application Ser. No. 700,877, filed June 29, 1976 now U.S. Pat. No. 4,068,976.

While the above arrangements have been satisfactory in most instances, it is desired to strengthen the cutting teeth on such inserts so as to prevent insert breakage during the milling operations.

The present invention has as its primary objective the provision of an improved insert of simplified construction having greater strength.

BRIEF SUMMARY OF THE INVENTION

According to the present invention, a hard wear resistant cutting insert is provided which has spaced apart, substantially parallel faces with a peripheral wall extending between and joining the faces. Cutting edge means is formed at the juncture of the peripheral wall with at least one of the faces. The cutting edge means preferably comprises at least two cutting edges. The peripheral wall has recesses formed therein which interrupt the cutting edge means with the depth of the recess in the peripheral wall decreasing as the recess extends away from the cutting edge means.

Preferably, the recess also narrows in width as it extends away from the cutting edge means and preferably terminates and blends with the peripheral wall some distance short of the face opposite the face from which the recess begins.

Although the cutting insert may be round, it is preferable that the faces of said insert are polygonal when viewed in plan and the cutting edge means comprises at least two cutting edges which may be angularly related to one another.

The recesses formed through the cutting edge means form upstanding cutting teeth on the insert which are preferably uniformly spaced along each edge of the insert. By staggering the recesses interrupting one cutting edge relative to the other recesses interrupting the other cutting edge, the two cutting edges may compliment one another to take a full cut when viewed in a superposed relation.

When two such inserts are arranged in a milling cutter with one following the other in a spaced relation, the second insert is arranged to remove those portions of the workpiece left by the preceding insert. These inserts are preferably indexable and invertable so that many patterns of at least two cutting edges are possible in order to achieve a full cut.

The pair of cutting edges may be angularly related and adjacent to one another on one face of the insert. The pair of cutting edges may also be formed one on each face along the side of the insert or, further, the pair of cutting edges may be formed with one on each of two opposing sides of the face of the insert.

The cutting edges are preferably formed in pairs or sets of two; however, it is possible to form three cutting edges on one insert so that when the cutting edges are superposed on one another, each one compliments the other so as to make a full cut on the workpiece. In particular, the cutting edge may even take the form of a sign wave configuration along the cutting edge, but with the recesses, however, terminating and blending with the peripheral wall.

The exact nature of the present invention will become more clearly apparent upon reference to the following detailed specification taken in connection with the accompanying drawings in which.

DETAILED DESCRIPTION OF THE INVENTION

Figure 1:
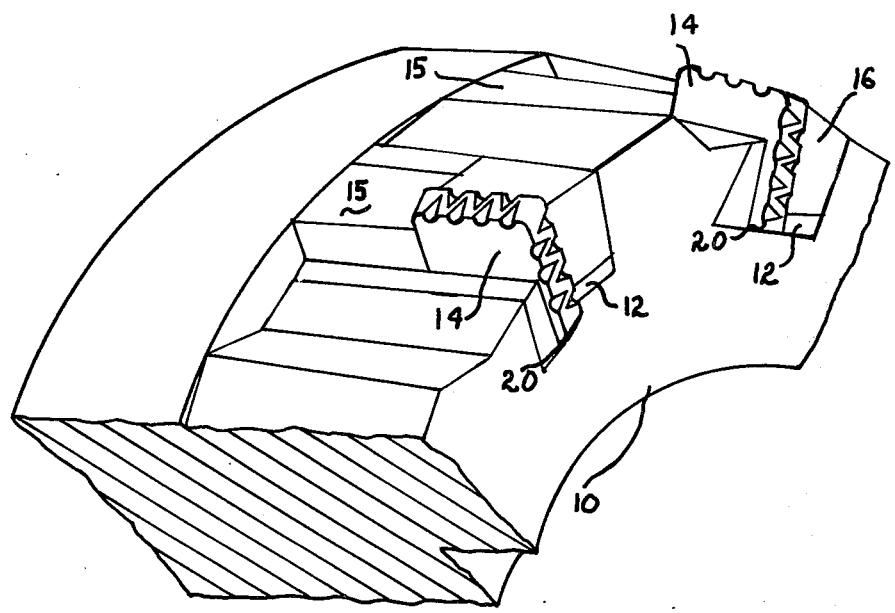
FIG. 1 is a fragmentary perspective view of a milling cutter having inserts according to the present invention which are mounted in two adjacent pockets which are distributed around the periphery of the body.

Referring to the drawings somewhat more in detail, 10 represents the body of a rotary cutter such as a milling cutter. The body 10 is provided with circumferentially distributed pockets 12 with a respective cutting insert 14 disposed in each pocket and fixedly clamped against the leading side of the pocket by a wedge element 16 disposed on the rearward side of the insert.

The axially inner edge of each insert is abutted by an abutment at 15 mounted in the pertaining pocket. The inserts in their radially inward direction abut the bottom surfaces 20 of the respective pockets and are thus located in a predetermined axial direction on a cutter body and in a predetermined radial direction so that the inserts are precisely aligned when clamped in the milling cutter body.

According to the present invention, each insert 14 has spaced substantially parallel faces 17 and 18 which may also be referred to as top and bottom surfaces 17 and 18 and these surfaces are joined by a peripheral wall 19. A cutting edge 21 is formed at the juncture of the peripheral wall with at least one of the top and bottom faces 17 and 18. Recesses 22 are formed in the peripheral wall and interrupt the cutting edge 21. The recesses 22 extend from the cutting edge 21 and have a decreasing depth as the recess 22 extends farther from said cutting edge 21. The recesses 22 also preferably become narrower in width as they extend farther from the cutting edge 21. The recesses 22, as shown in FIG. 2, preferably terminate and blend with peripheral wall 19 before they extend through other face 18 of the insert 14.

Figure 2:
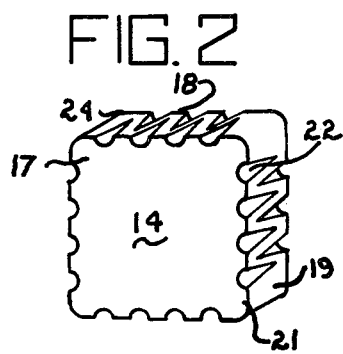
FIG. 2 is a perspective view of an insert according to the present invention.

As can be seen in FIG. 2, the other face 18 has a cutting edge 24 formed along the juncture of the peripheral wall which would be face 18. Preferably, there are at least two cutting edges 21 and 24 formed on these inserts which will be referred to as cutting edge means. When the cutting edge means preferably is comprised of at least two cutting edges, the two cutting edges and recesses should be complimentary to each other so that a full cut will be taken when the two are placed in a superposed relationship in a milling cutter body.

Figure 3:
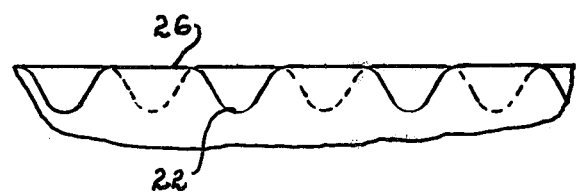
FIG. 3 is an elevation of the cutting edges of the insert shown in FIG. 2 with the two cutting edges in superposed relation.

With reference to FIG. 3, what is shown therein are two cutting edges of the insert according to FIG. 2 shown in superposed relation. The grooves 22 are shown along one cutting edge of the insert which, in some cases, will form flat cutting edge teeth 26. If the recesses and cutting edge teeth 26 are uniformly spaced along the length of the cutting edge, then it is preferable that the pair of cutting edges making up the cutting edge means be arranged on the insert body so that the teeth 26 of one cutting edge mate with the grooves 22 of the other cutting edge when viewed in a superposed relation.

This invention is not necessarily limited to two cutting edges cooperating to make a full cut as one may choose that a pattern of two or more cutting edges may be used to achieve a full cut on a workpiece. The cooperating and complimenting cutting edges can be formed in various patterns and locations on the cutting insert. Since it is desirable that the cutting edge be both indexable and invertable, many possibilities present themselves on how to arrange the cooperating cutting edges.

Figure 4:
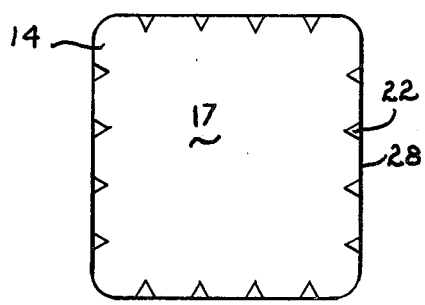
FIG. 4 shows a top surface of an insert according to the present invention.

Shown in FIG. 4 is a top face of a rectangular cutting insert which is indexable and invertable and has an equal number of recesses 22 formed on each side 28 of the insert. All four sides, as shown in FIG. 4, are identical to the one side 28.

Figure 5:
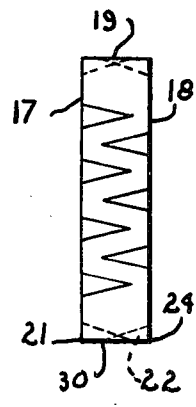
FIG. 5 shows a side view of an insert according to the present invention.

FIG. 5 is a side view of the insert showing the top face 17 which is shown in FIG. 4 and the peripheral wall of the cutting insert and the other face 18. The recesses 22 are shown by a dotted line at the bottom of FIG. 5 and have the greatest depth where they interrupt the cutting edge means 21 and then have a decreasing depth as the groove extends away from the cutting edge 24.

The groove then terminates and blends with the peripheral wall 19 as shown at 30 in FIG. 5. Recesses 22 also are extending from cutting edge 21 toward the cutting edge 24. Again, the grooves 22 become shallower and terminate and blend with the peripheral wall before reaching cutting edge 24. The recesses 22 are also preferably narrow in width as they extend away from the cutting edge as shown in FIGS. 1 and 2.

Figure 6:
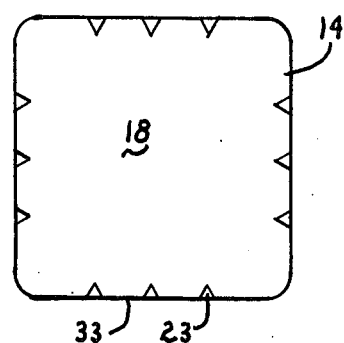
FIG. 6 shows the bottom surface of the insert of FIG. 4.

Shown in FIG. 6 is the bottom face 18 of cutting insert 14, but now having recesses 23 formed in a side 33 of the insert and having all four sides identical to side 33.

In FIG. 6, the face 18 has an odd number of grooves 23 formed therein which will cooperate with the grooves 22 formed in face 17 as shown in FIG. 4. The two sides 33 and 28, when viewed in superposed relation, should appear as shown in FIG. 3. When a single insert is manufactured, as is shown in FIGS. 3 to 6, two of the same inserts, by being placed properly in the milling cutter, can make staggered complimentary cuts in relation to each other to complete a full final cut on the workpiece.

Figure 7:
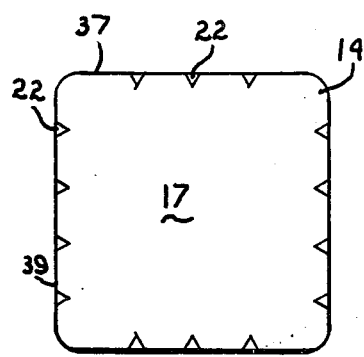
FIGS. 7, 8 and 9 show views of a top surface of an insert according to the present invention.

FIG. 7 is again a cutting insert 14 having a top face 17 but now showing that the number of grooves 22 on one side 37 of the insert may differ in number from the number of grooves 22 shown in an adjacent side 39 of an insert 14. The bottom face 18 of an insert as shown in FIG. 7 may then have a configuration such that a cutting edge with a configuration of side 39 may be cooperating with cutting edge 37 so as to have a superposed relation as shown in FIG. 3.

Figure 8:
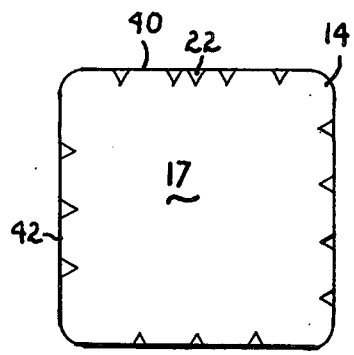

FIG. 8 further shows an insert 14 having a top face 16 showing a still different pattern of grooves 22 that may be put in the sides 40 and 42 of the insert. On the bottom half of the insert, as shown in FIG. 8, the cooperating face 18 would then have to have a side similar to 42 matched with the side 40 so as to be complimentary when viewed in a superposed relationship as shown in FIG. 3.

Figure 9:
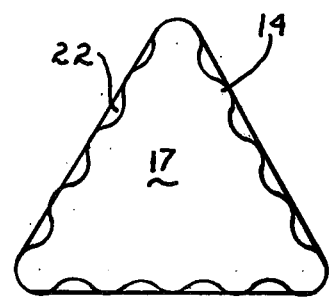

FIG. 9 is showing a still further variation of an insert 14, this one being triangular in nature and having a sign wave configuration formed by grooves 22. Shown, of course, is a top face 17 and by now it is realized that bottom face 18 would have a complimentary configuration as has been illustrated and described in the other inserts listed above.

Figure 10:
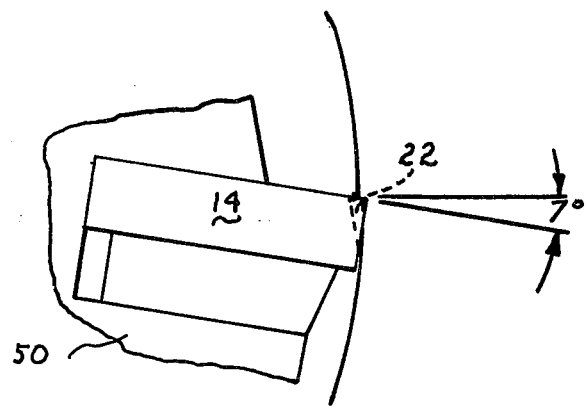
FIG. 10 is a side view of a holder and an insert according to the present invention.

FIG. 10 shows a cutting insert 14 in a holder 50 and being presented to the workpiece, preferably with an approximately 7 negative radial rake. All the inserts of this type must be presented in a radially negative rake so as to provide clearance for the workpiece to pass once the cut has been made.

As can be seen in FIG. 10, when the groove 22 does not extend completely through both sides of the peripheral wall, then the cutting tooth created by the recesses 22 have more backing and are, therefore, stronger, thereby aiding in prevention of premature failure of the insert during a cutting operation.

Modifications may be made within the scope of the appended claims.

What is claimed is:

1. A cutting insert comprising: a body of hard wear resistant material having spaced substantially parallel faces that are polygonal when viewed in plan; a peripheral wall extending between said faces; cutting edge means comprising at least two cutting edges formed at the juncture of said peripheral wall and at least one of said faces, said peripheral wall having recesses formed therein interrupting said cutting edge means; said recesses interrupting one cutting edge of said insert being staggered relative to the recesses interrupting the other cutting edge of the insert when said cutting edges are viewed in superposed relation; the depth of said recesses in said peripheral wall decreasing as the recess extends away from said cutting edge means; and said two cutting edges formed one on each face along the same side of said insert.

2. A cutting insert according to claim 1 wherein said faces are polygonal when viewed in plan and said cutting edge means comprise at least two cutting edges.

3. A cutting insert according to claim 2 wherein the recesses interrupting one cutting edge of said insert are staggered relative to the recesses interrupting the other cutting edge of the insert when said cutting edges are viewed in superposed relation.

4. A cutting insert according to claim 3 in which said recesses are uniformly spaced along the peripheral wall of said insert.

5. A cutting insert according to claim 4 in which said recesses in one cutting edge are asymmetrically disposed about an axial centerline of the insert so that the recesses of one cutting edge are staggered relative to the other cutting edge when viewed in superposed relation.

6. A cutting insert according to claim 3 wherein the number of recesses interrupting one cutting edge are equal to the number of recesses interrupting the other of two said cutting edges.

7. A cutting insert according to claim 3 wherein the number of recesses interrupting one cutting edge are unequal to the number of recesses interrupting the other of two said cutting edges.

8. A cutting insert according to claim 2 wherein said two cutting edges are angularly related and adjacent to one another.

9. A cutting insert according to claim 1 wherein said recesses become narrower as they extend away from said cutting edge means.

10. A cutting insert according to claim 1 in which said recesses terminate in said peripheral wall without interrupting the other of said one of said faces.

11. A cutting insert comprising: a body of hard wear resistant material having spaced substantially parallel faces that are polygonal when viewed in plan; a peripheral wall extending between said faces; cutting edge means comprising at least two cutting edges formed at the juncture of said peripheral wall and at least one of said faces, said peripheral wall having recesses formed therein interrupting said cutting edge means; said recesses interrupting one cutting edge of said insert being staggered relative to the recesses interrupting the other cutting edge of the insert when said cutting edges are viewed in superposed relation; the depth of said recesses in said peripheral wall decreasing as the recess extends away from said cutting edge means; and said two cutting edges are formed one on each of two opposing sides on the same face of the insert.

* * * * *